United States Patent
Kim et al.

(10) Patent No.: US 11,332,378 B2
(45) Date of Patent: May 17, 2022

(54) METHOD FOR PRODUCING SILICA AEROGEL

(71) Applicant: LG CHEM, LTD., Seoul (KR)

(72) Inventors: Jong Hun Kim, Daejeon (KR); Se Won Baek, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 17/056,841

(22) PCT Filed: Nov. 27, 2019

(86) PCT No.: PCT/KR2019/016457
§ 371 (c)(1),
(2) Date: Nov. 19, 2020

(87) PCT Pub. No.: WO2020/111768
PCT Pub. Date: Jun. 4, 2020

(65) Prior Publication Data
US 2021/0206648 A1      Jul. 8, 2021

(30) Foreign Application Priority Data
Nov. 27, 2018   (KR) .................... 10-2018-0147976

(51) Int. Cl.
| | |
|---|---|
| *C01B 33/158* | (2006.01) |
| *C04B 14/06* | (2006.01) |
| *C01B 33/20* | (2006.01) |
| *C03B 19/10* | (2006.01) |
| *C04B 38/00* | (2006.01) |
| *C03B 7/094* | (2006.01) |

(52) U.S. Cl.
CPC .......... *C01B 33/1585* (2013.01); *C01B 33/20* (2013.01); *C03B 7/094* (2013.01); *C03B 19/1065* (2013.01); *C04B 14/064* (2013.01); *C04B 38/0045* (2013.01); *C08G 2330/00* (2013.01); *C08J 2205/026* (2013.01)

(58) Field of Classification Search
CPC ..... C01B 33/1585; C01B 33/20; C03B 7/094; C03B 19/1065; C04B 14/064; C04B 38/0045; C08G 2330/00; C08J 2205/026
See application file for complete search history.

(56) References Cited

U.S. PATENT DOCUMENTS

| | | | |
|---|---|---|---|
| 6,210,751 B1 | 4/2001 | Schwertfeger | |
| 10,464,816 B2 * | 11/2019 | Oh ........................ | F16L 59/029 |
| 2007/0154698 A1 | 7/2007 | Stepanian | |
| 2018/0086587 A1 | 3/2018 | Kim et al. | |
| 2018/0134566 A1 | 5/2018 | Kim et al. | |
| 2018/0305215 A1 | 10/2018 | Kim et al. | |
| 2018/0326700 A1 | 11/2018 | Kim | |
| 2018/0355551 A1 | 12/2018 | Kim et al. | |
| 2019/0002356 A1 | 1/2019 | Hebalkar | |
| 2019/0010060 A1 | 1/2019 | Oh et al. | |
| 2019/0275489 A1 | 9/2019 | Kim et al. | |
| 2020/0179894 A1 | 6/2020 | Kang et al. | |
| 2020/0189920 A1 | 6/2020 | Kim et al. | |

FOREIGN PATENT DOCUMENTS

| | | |
|---|---|---|
| CN | 1158310 C | 7/2004 |
| EP | 3284721 A1 | 2/2018 |
| EP | 3342754 A1 | 7/2018 |
| EP | 3354620 A1 | 8/2018 |
| KR | 10-0501758 | 10/2005 |
| KR | 10-1654795 | 9/2016 |
| KR | 10-1748532 | 6/2017 |
| KR | 10-2017-0096516 | 8/2017 |
| KR | 10-2018-0029235 | 3/2018 |
| KR | 10-2018-0029500 | 3/2018 |
| KR | 10-2018-0040372 | 4/2018 |
| KR | 10-2018-0105981 | 10/2018 |

OTHER PUBLICATIONS

Extended Search Report of European Patent Office in Appl'n No. 19889826.4, dated Mar. 11, 2021.

* cited by examiner

*Primary Examiner* — Anthony J Zimmer
*Assistant Examiner* — Logan Edward Laclair
(74) *Attorney, Agent, or Firm* — Dentons US LLP

(57) ABSTRACT

A method for producing a silica aerogel, the method including preparing a reactant by adding a basic catalyst to a first silica precursor solution, performing primary gelation in which the reactant is stirred to form a gel precursor, introducing a second silica precursor solution to a fiber, and performing a secondary gelation in which the gel precursor is introduced to the fiber to which the second silica precursor solution was introduced to form a silica aerogel.

8 Claims, No Drawings

METHOD FOR PRODUCING SILICA AEROGEL

CROSS-REFERENCE TO RELATED APPLICATIONS

This application is a National Stage Application of International Application No. PCT/KR2019/016457, filed on Nov. 27, 2019, which claims the benefit of Korean Patent Application No. 10-2018-0147976, filed on Nov. 27, 2018, in the Korean Intellectual Property Office, the disclosure of which is incorporated herein in its entirety by reference.

TECHNICAL FIELD

The present invention relates to a method for producing a silica aerogel having improved thermal insulation performance.

BACKGROUND

A silica aerogel is a super-porous, high specific surface area material having a porosity of about 90% to 99.9% and a pore size in the range of 1 nm to 100 nm, which is a material having excellent properties such as ultra-light weight/ultra-heat insulation/ultra-low dielectric, and the like. Accordingly, research on the development of aerogel materials as well as research on the practical use thereof as transparent insulation materials, environmentally friendly high temperature insulation materials, ultra-low dielectric thin films for highly integrated devices, catalysts and catalyst carriers, electrodes for supercapacitors, and electrode materials for seawater desalination have been actively conducted.

The biggest advantage of a silica aerogel is super-insulation properties exhibiting a thermal conductivity of 0.300 W/mK or less, which is lower than that of a conventional organic heat insulation material such as typical Styrofoam. In addition, fire vulnerability and the generation of harmful gases in case of occurrence of fire which are fatal weaknesses of an organic insulation material may be solved.

In general, the aerogel is produced by preparing a hydrogel from a silica precursor such as water glass and an analkoxysilane-based compound, and then removing a liquid component inside the hydrogel without destroying a microstructure. A silica aerogel may be typically classified into three types, i.e., powder, granule, and monolith, and the silica aerogel is generally produced in the form of powder.

In general, the silica aerogel is produced through a sol-gel process, which includes sol formation, gel formation, aging, solvent replacement, surface modification, and drying steps.

More specifically, the gel formation step is performed by introducing a sol which has been formed by the reaction of an alkoxy silane compound and a base catalyst to a fiber. However, while introducing the catalyzed sol to the fiber, the sol flows down to a lower portion of the fiber, so that there is a problem in that it is difficult to uniformly introduce the sol to the fiber. At this time, in the step of gel formation, it is necessary to develop a new method for producing a silica aerogel, the method capable of improving the impregnation with a simpler process, thereby producing a silica aerogel excellent in thermal insulation performance.

PRIOR ART DOCUMENT

Patent Document (Patent Document 1) KR2018-0029235 A (Mar. 20, 2018)

DISCLOSURE OF THE INVENTION

Technical Problem

An aspect of the present invention provides a method for producing a silica aerogel, the method capable of uniformly distributing a gel in a fiber in order to improve the thermal insulation performance.

Technical Solution

According to an aspect of the present invention, there is provided a method for producing a silica aerogel, the method including preparing a reactant by adding a basic catalyst to a first silica precursor solution, performing primary gelation in which the reactant is stirred to form a gel precursor, introducing a second silica precursor solution to a fiber, and performing secondary gelation in which the gel precursor is introduced to the fiber to which the second silica precursor solution was introduced to form a silica aerogel.

At this time, the viscosity of the gel precursor may be 1 cP to 25 cP at 25° C.

Meanwhile, the primary gelation may be performed under the temperature condition of 10° C. to 70° C.

Meanwhile, the stirring rate of the primary gelation may be 50 rpm to 500 rpm.

More specifically, the first silica precursor solution and the second silica precursor solution may include a tetra alkoxy silane compound and an organic solvent.

At this time, the tetra alkoxy silane compound is hydrated to 30% to 45%.

Meanwhile, the first silica precursor solution may include the tetra alkoxy silane compound in an amount of 0.01 parts by weight to 15 parts by weight based on 100 parts by weight of the first silica precursor solution.

Also, the second silica precursor solution may include the tetra alkoxy silane compound in an amount of 50 parts by weight to 80 parts by weight based on 100 parts by weight of the second silica precursor solution.

For example, the organic solvent may include at least one compound selected from the group consisting of an alcohol-based compound, a hydrocarbon-based compound, and a ketone-based compound.

According to another aspect of the present invention, there is provided a method for producing a silica aerogel sheet, the method including preparing a reactant by adding a basic catalyst to a first silica precursor solution, performing primary gelation in which the reactant is stirred to form a gel precursor, introducing a second silica precursor solution to a continuous fiber sheet, performing secondary gelation in which the gel precursor is introduced to the continuous fiber sheet to which the second silica precursor solution was introduced to be gelled, and forming a plurality of layers by winding the secondary gelled continuous fiber sheet.

Advantageous Effects

When a silica aerogel is produced according to the present invention, a gel is formed to a uniform distribution in the silica aerogel, so that a silica aerogel having excellent thermal insulation performance while being thin may be provided.

DETAILED DESCRIPTION

Hereinafter, the present invention will be described in more detail.

It will be understood that words or terms used in the specification and claims shall not be interpreted as having the meaning defined in commonly used dictionaries.

It will be further understood that the words or terms should be interpreted as having a meaning that is consistent with their meaning in the context of the relevant art and the technical idea of the invention, based on the principle that an inventor may properly define the meaning of the words or terms to best explain the invention.

The terminology used herein is for the purpose of describing particular exemplary embodiments only and is not intended to be limiting of the present invention. The terms of a singular form may include plural forms unless the context clearly indicates otherwise.

In the present specification, it should be understood that the terms "include," "comprise," or "have" are intended to specify the presence of stated features, numbers, steps, elements, or combinations thereof, but do not preclude the presence or addition of one or more other features, numbers, steps, elements, or combinations thereof.

<Method for Producing Silica Aerogel>

A method for producing a silica aerogel according to the present invention includes (1) preparing a reactant by adding a basic catalyst to a first silica precursor solution, (2) performing primary gelation in which the reactant is stirred to form a gel precursor, (3) introducing a second silica precursor solution to a fiber, and (4) performing secondary gelation in which the gel precursor is introduced to the fiber to which the second silica precursor solution was introduced to form a silica aerogel. Hereinafter, each step will be described.

(1) Preparing Reactant

A reactant of the present invention may be prepared by adding a basic catalyst to a first silica precursor solution.

The first silica precursor solution may include a tetra alkoxy silane compound and an organic solvent.

First, the tetra alkoxy silane compound is a compound corresponding to a silica precursor in which an alkoxy group attached to silane is hydrated to serve as a linkage with another tetra alkoxy silane compound to perform a gelation reaction.

The tetra alkoxy silane compound may be a tetra alkyl silicate such as tetramethyl orthosilicate (TMOS), tetraethyl orthosilicate (TEOS), methyl triethyl orthosilicate, dimethyl diethyl orthosilicate, tetrapropyl orthosilicate, tetraisopropyl orthosilicate, tetrabutyl orthosilicate, tetra secondary butyl orthosilicate, tetra tertiary butyl orthosilicate, tetrahexyl orthosilicate, tetracyclohexyl orthosilicate, and tetradodecyl orthosilicate. Among the above, more specifically, the tetra alkoxy silane compound may be tetramethyl orthosilicate (TMOS), tetraethyl orthosilicate (TEOS), or a mixture thereof.

At this time, the tetra alkoxy silane compound may be included in an amount of 0.01 parts by weight to 15 parts by weight, preferably 0.01 parts by weight to 10 parts by weight, more preferably 0.5 parts by weight to 10 parts by weight based on 100 parts by weight of the first silica precursor solution. When the tetra alkoxy silane compound is included in the above range, in a primary gelation step to be described below, a gel precursor may be formed by inhibiting the formation of a large-sized gel having high viscosity.

Meanwhile, the tetra alkoxy silane compound may be hydrated to 30% to 45%, and may preferably be hydrated to 32.5% to 45%, more preferably 35% to 45%. The degree of hydration of the tetra alkoxy silane compound is represented by calculating the ratio of a hydroxy group (—OH) formed through a hydration reaction among alkoxy groups (—OR) attached to silane.

At this time, when the tetra alkoxy silane compound is hydrated within the above range, the rate of primary and secondary gelation reactions according to the present invention is increased so that the reaction time may be shortened. As a result, the economic feasibility of the process may be improved.

Next, the organic solvent may promote a surface modification reaction of a silica aerogel, and may control the hydration reaction of the tetra alkoxy silane compound included in the first silica precursor solution.

Meanwhile, the kind of the organic solvent is not particularly limited. For example, the organic solvent may include at least one compound selected from the group consisting of an alcohol-based compound, a hydrocarbon-based compound, and a ketone-based compound. More specifically, the organic solvent may include an alcohol compound such as methanol, ethanol, isopropanol or propanol, a hydrocarbon-based compound such as hexane, octane, n-decane, n-heptane, n-undecane, cyclohexane or toluene, a ketone-based compound such as methyl ethyl ketone or acetone. Any one thereof or a mixture of two or more thereof may be used.

(2) Primary Gelation

The primary gelation step is a step for forming a gel precursor by stirring a reactant in which a basic catalyst is added to the first silica precursor solution.

In general, in order to form an aerogel, a sol-gel method for introducing a sol, which has been prepared by reacting an alkoxy silane compound under the basic catalyst, directly to a fiber and then forming a gel is used. However, the method has a problem in that it is difficult to produce a uniform aerogel since a gel may be concentrated in a specific portion of a fiber or may not penetrates inside the fiber.

Therefore, in the present invention, a silica aerogel was produced using a gel precursor having a lower viscosity and a smaller volume than a gel in order to enhance the structure.

When a gel precursor is introduced to a fiber as described above, the gel precursor penetrates even inside the fiber to uniformly form a silica-aerogel while the physical rigidity of the structure of the silica aerogel is excellent by using the gel precursor having a higher viscosity than the sol.

At this time, the primary gelation step may be performed under the temperature condition of 10° C. to 70° C., preferably 15° C. to 60° C., more preferably 20 to 50° C. When the primary gelation step is performed under the above temperature conditions, it is not only possible to increase the rate of a gelation reaction to increase the efficiency of the process, but it is also possible to prevent a gel from growing into a bulky gel having a high viscosity.

Meanwhile, the gel precursor is formed by the stirring of a reactant. When the reactant is not stirred when performing a gelation reaction, a gelation reaction having a low viscosity and a small volume may not be formed. That is, when the gelation reaction is performed without stirring, compounds are entangled with each other in the first silica precursor solution to form a bulk gel having a high viscosity. However, when a gel precursor is formed by stirring, it is possible to control a phenomenon in which the compounds are entangled with each other in the first silica precursor solution, so that a gel precursor with a low viscosity may be formed.

More specifically, the primary gelation step may be performed at a stirring rate of 50 rpm to 500 rpm, preferably 100 rpm to 450 rpm, and more preferably 200 rpm to 400.

In the primary gelation step, when the stirring rate is in the above range, when a gel is formed by compounds entangled with each other in the first silica precursor solution, a gel precursor having a viscosity and a volume in a predetermined range may be formed.

For example, the viscosity of the gel precursor may be 1 cP to 25 cP, preferably 1 cP to 24 cP, more preferably 1 cP to 23 cP at 25° C. When the viscosity of the gel precursor is in the above range, the penetration of a gel into the fiber is facilitated, so that a uniform silica aerogel may be formed, and since it is possible to perform the gelation reaction sufficiently, the physical properties of the silica aerogel may be prevented to be deteriorated.

(3) Introducing Second Silica Precursor Solution

Next, a second silica precursor solution is introduced to a fiber.

At this time, the second silica precursor solution includes a tetra alkoxy silane compound and an organic solvent. The descriptions of the tetra alkoxy silane compound and the organic solvent are the same as those described above, and thus, detailed descriptions thereof will be omitted.

Meanwhile, the tetra alkoxy silane compound may be included in an amount of 50 parts by weight to 80 parts by weight, preferably 55 parts by weight to 75 parts by weight, more preferably 55 parts by weight to 70 parts by weight based on 100 parts by weight of the second silica precursor solution. When the tetra alkoxy silane compound is included within the above range, a bulk gel having a high viscosity is formed, thereby improving the physical properties of a silica aerogel such as mechanical properties.

The kind of the fiber is not particularly limited. For example, a polymer fiber or a glass fiber may be used. Specifically, the polymer fiber may be polyamide, polybenzimidazole, polyaramid, an acryl resin, a phenol resin, polyester, polyetheretherketone (PEEK), polyolefin (for example, polyethylene, polypropylene, a copolymer thereof, or the like), cellulose, carbon, cotton, wool, hemp, a nonwoven fabric, ceramic wool, or the like. More specifically, the fiber may include a glass fiber or a polyethylene fiber.

Meanwhile, for convenience of description, the second silica precursor solution introduction step is described as a following step after the reactant preparation step and the primary gelation step. However, the second silica precursor solution introduction step is a step performed separately from the reactant preparation step and the primary gelation step. As long as the second silica precursor solution introduction step is performed before the secondary gelation step, it is sufficient, and the step does not necessarily need to be performed followed by the reactant preparation step and the primary gelation step. That is, the second silica precursor solution introduction step may be performed before, simultaneously, or after the reactant preparation step and the primary gelation step, as necessary.

(4) Secondary Gelation

Lastly, a secondary gelation step will be described, the step in which the gel precursor is introduced to the fiber to which the second silica precursor solution has been introduced to form a silica aerogel.

The gel precursor is introduced to the fiber to which the silica precursor solution has been introduced, and then a gelation reaction is performed. When a second silica precursor solution is first introduced to a fiber and then a gel precursor is additionally introduced thereto, when compared with a typical method in which a gelation reaction is performed in a sol state, there is an effect in which the physical properties are improved since a gel penetrates uniformly to the inside/outside of the fiber while the mechanical rigidity is maintained to a predetermined level or higher.

Meanwhile, according to another embodiment of the present invention, a method for producing a silica aerogel sheet may be provided.

More specifically, the method includes (1) preparing a reactant by adding a basic catalyst to a first silica precursor solution, (2) performing primary gelation in which the reactant is stirred to form a gel precursor, (3) introducing a second silica precursor solution to a continuous fiber sheet, (4) performing secondary gelation in which the gel precursor is introduced to the continuous fiber sheet to which the second silica precursor solution has been introduced to be gelled, and (5) forming a plurality of layers by winding the secondary gelled continuous fiber sheet.

Step (1) to Step (4) are the same as those described above, and thus, detailed descriptions thereof will be omitted. However, in Step (3), there is a difference in that a continuous fiber sheet is used. The continuous fiber sheet may be formed continuously or semi-continuously by providing a fiber sheet on a moving element at an appropriate rate.

Meanwhile, the step of forming a plurality of layers by winding a secondary gelled continuous fiber sheet is a novel and effective method for producing a gelled fiber sheet for an effective drying process. In another aspect, an optional spacer material is rolled with the gelled fiber sheet. Such a spacer material may substantially be fluid permeable or fluid impermeable. Depending on the degree of permeation of the spacer material to the gelled fiber sheet, an appropriate flow pattern may be obtained in a subsequent drying process. In addition, if an aging process is performed after gelation, a spacer material provides a suitable flow path for an aged solution such that the aged solution may easily pass through the surface of a gelled fiber sheet or inside the fiber sheet. In addition, in the drying process, the spacer material provides a flow path for dry air (for example, dry air for atmospheric drying) or dry fluid (for example, supercritical fluid) in a direction which effectively reduces the thickness of the gelled fiber sheet extracted in the radial direction to easily adjust the thickness of a gelled fiber sheet to be finally produced.

In addition, the manufacturing method according to an embodiment of the present invention may perform an aging step as a process for allowing a chemical change to be completely achieved by leaving the secondary gelled silica aerogel or a silica aerogel sheet to stand at a suitable temperature. The aging step may more firmly form the formed network structure, and thus, may enhance the mechanical stability of the aerogel blanket of the present invention. At this time, when the silica aerogel sheet is produced, the aging process may be performed after Step (4) and before Step (5), but preferably, may be performed after Step (5).

The aging step of the present invention is performed by adding a solution in which a basic catalyst such as sodium hydroxide (NaOH), potassium hydroxide (KOH), ammonium hydroxide (NH$_4$OH), triethylamine, pyridine, and the like is diluted in an organic solvent at a concentration of 1-10%. Therefore, there is an effect of facilitating the maintenance of the pore structure in a quick drying process to be performed later by inducing a Si—O—Si bonding in an aerogel to the maximum to allow the network structure of a gel to be more firm, At this time, the organic solvent may be at least one compound selected from the group consisting of an alcohol-based compound, a hydrocarbon-based compound, and a ketone-based compound, and specifically, may include an alcohol-based compound such as ethanol.

Also, the aging step should be performed in a suitable temperature range to enhance the optimal pore structure. The aging step of the present invention may be performed by leaving the wet gel blanket to stand for 1-10 hours at a temperature of 30-70° C. When the aging temperature satisfies the above range, aging efficiency may be further improved to increase productivity. Also, when ethanol is used as an organic solvent, the above temperature range is a temperature range below the boiling point of the ethanol, so that it is possible to prevent the solvent loss due to evaporation.

In addition, according to an embodiment of the present invention, a surface modification step may be further performed to manufacture a hydrophobic silica aerogel or silica aerogel blanket.

When a hydrophilic functional group present on the surface of an aerogel is substituted with a hydrophobic functional group, the shrinkage of pores due to the surface tension of a solvent during the drying of the aerogel may be minimized by the repulsive force between hydrophobic functional groups. The dried aerogel maintains low thermal conductivity immediately after being dried. However, since a hydroxy functional group present on the surface of an aerogel, for example, when the aerogel is a silica aerogel, a hydrophilic silanol group (Si—OH) present on the surface of silica absorbs water in the air, there is a disadvantage in that thermal conductivity is gradually increased. Therefore, in order to maintain low thermal conductivity, there is a need to modify the surface of the aerogel to be hydrophobic.

Accordingly, the surface modification according to an embodiment of the present invention may be performed by a surface modifier including a polar solvent and an organosilane compound.

As the polar solvent, methanol, ethanol, isopropyl alcohol, or the like may be used, and as the organosilane compound, trimethylchlorosilane (TMCS), hexamethyldisilazane (HMDS), methyltrimethoxysilane, trimethylethoxysilane, ethyltriethoxysilane, phenyltriethoxysilane, or the like may be used. Specifically, hexamethyldisilazane may be used.

In the surface modification, it is preferable that the solvent is preferably mixed at a volume ratio of 1 to 10 with respect to the gel, and the organosilane compound is mixed at a volume ratio of 0.1 to 10 with respect to the gel. When the volume ratio of the organosilane compound satisfies the above range, optimal reaction time may be obtained, and the surface modification is performed using an appropriate amount of a surface modifier, so that the problem of cost rise is solved and the phenomenon in that the gel structure is contracted during drying by the residual unreacted surface modifier is prevented.

In addition, according to an embodiment of the present invention, a surface modification step may be further performed to manufacture silica aerogel blanket.

Meanwhile, a production method according to an embodiment of the present invention may further perform a washing step before the drying. The washing is a step for removing impurities (sodium ions, unreacted substances, by-products, and the like) generated during the reaction and residual ammonia, which may generate an ammonium carbonate salt by reacting with $CO_2$ during supercritical drying, and the like in order to obtain a hydrophobic silica aerogel with high purity, and may be performed by a dilution process or an exchange process using a non-polar organic solvent.

The drying step according to an embodiment of the present invention may be performed through a process for removing a solvent while maintaining the pore structure of the aged gel, and the drying step may be performed by a supercritical drying process or an ambient drying process.

The supercritical drying process may be performed using supercritical carbon dioxide. Carbon dioxide ($CO_2$) is in a gaseous state at room temperature and atmospheric pressure. However, when a temperature and pressure exceed a predetermined temperature and pressure limit called a supercritical point, the evaporation process does not occur so that carbon dioxide becomes to be in a critical state in which gas and liquid cannot be distinguished. Carbon dioxide in a critical state is referred to a supercritical carbon dioxide.

A supercritical carbon dioxide has a molecular density close to that of a liquid, however, has a low viscosity, thereby having properties close to those of gas. Therefore, a supercritical carbon dioxide has a high diffusion rate and a high thermal conductivity so that drying efficiency thereof is high, and drying process time may be shortened.

Specifically, the supercritical drying process performed a solvent substitution process in which an aged wet gel blanket is placed into a supercritical drying reactor, and then $CO_2$ in a liquid state is filled therein, followed by substituting an alcohol solvent inside the wet gel with $CO_2$. Thereafter, the temperature is raised to 40-70° C. at a predetermined temperature raising rate, specifically, 0.1° C./min to 1° C./min, and the pressure which is greater than a pressure at which carbon dioxide becomes to be a supercritical state, specifically, the pressure of 100 bar to 170 bar is maintained to allow the carbon dioxide to remain in the supercritical state for a predetermined amount of time, specifically for 20 minutes to 1 hour. In general, carbon dioxide becomes to be in a supercritical state at the temperature of 31° C. and at the pressure of 73.8 bar. The carbon dioxide is maintained to remain at a certain temperature and certain pressure, at which the carbon dioxide becomes supercritical, for 2 hours to 12 hours, more specifically, 2 hours to 6 hours, and then, the pressure is generally lowered to complete the supercritical drying process so that a dried silica aerogel or silica aerogel sheet may be produced.

Also, the ambient drying process may be performed according to a typical method such as hot air drying and IR drying under a temperature of 70-200° C. and atmospheric pressure (1±0.3 atm).

As a result of the above drying process, a blanket including a porous aerogel having nano-sized pores may be manufactured. Particularly, the silica aerogel according to an embodiment of the present invention has excellent physical properties together with high hydrophobicity, especially low tap density and high porosity, and excellent mechanical flexibility together with low thermal conductivity.

Hereinafter, the present invention will be described in more detail with reference to specific examples. However, the following examples are merely illustrative of the present invention and are not intended to limit the scope of the present invention. It will be apparent to those skilled in the art that various changes and modifications can be made without departing from the scope and spirit of the invention, and it is obvious that such variations and modifications are within the scope of the appended claims.

EXAMPLES

1. Example 1

(1) Gel Precursor Preparation (Primary Gelation)

Ethanol was mixed with 2.5 wt % of hydro tetraethyl orthosilicate (hereinafter, referred to as HTEOS) (hydrated 42.5%) to prepare a first silica precursor solution. Thereafter, the first silica precursor solution was added with $NH_4OH$, which is a base catalyst (the base catalyst was added at 0.5 parts by volume with respect to 100 parts by volume of the gel precursor prepared), to prepare a reactant, and then the mixture was stirred for an hour with a rate of 250 rpm at 25° C. to prepare a gel precursor through a primary gelation reaction.

(2) Silica Aerogel Production (Secondary Gelation)

Ethanol was mixed with 64 wt % of HTEOS (hydrated 42.5%) to prepare a second silica precursor solution, and then the second silica precursor solution was introduced to glass fiber. Thereafter, the gel precursor was introduced thereto to perform a gelation reaction. Thereafter, using 2.9 vol % of $NH_4OH$ and ethanol having a water content of 10 wt %, aging was performed for an hour at 50° C. Thereafter, using 6.5 vol % of hexamethyldisilazane (hereinafter, referred to as HMDS) and ethanol having a water content of 10 wt %, surface modification was performed for 4 hours at 70° C. Lastly, under the condition of 150 bar and 70° C., supercritical drying was performed using $CO_2$ to produce silica aerogel.

2. Example 2

Silica aerogel was produced in the same manner as in Example 1 except that a first silica precursor solution containing 0.83 wt % of HTEOS (hydrated 42.5%) was used when preparing a gel precursor and a second silica precursor solution containing 66 wt % of HTEOS (hydrated 42.5%) was used when performing a secondary gelation reaction.

3. Example 3

Silica aerogel was produced in the same manner as in Example 1 except that a first silica precursor solution containing 1.6 wt % of HTEOS (hydrated 42.5%) was used when preparing a gel precursor and a second silica precursor solution containing 65 wt % of HTEOS (hydrated 42.5%) was used when performing a secondary gelation reaction.

4. Example 4

Silica aerogel was produced in the same manner as in Example 1 except that a first silica precursor solution containing 3.3 wt % of HTEOS (hydrated 42.5%) was used when preparing a gel precursor and a second silica precursor solution containing 63 wt % of HTEOS (hydrated 42.5%) was used when performing a secondary gelation reaction.

5. Example 5

Silica aerogel was produced in the same manner as in Example 1 except that a first silica precursor solution containing 4.8 wt % of HTEOS (hydrated 42.5%) was used when preparing a gel precursor and a second silica precursor solution containing 61 wt % of HTEOS (hydrated 42.5%) was used when performing a secondary gelation reaction.

6. Example 6

Silica aerogel was produced in the same manner as in Example 1 except that stirring was performed for an hour under the stirring condition of 400 rpm and 25° C. when preparing a gel precursor (primary gelation).

7. Example 7

Silica aerogel was produced in the same manner as in Example 1 except that stirring was performed for an hour under the stirring condition of 250 rpm and 40° C. when preparing a gel precursor (primary gelation).

8. Example 8

Silica aerogel was produced in the same manner as in Example 1 except that stirring was performed for three hours under the stirring condition of 250 rpm and 25° C. when preparing a gel precursor (primary gelation).

COMPARATIVE EXAMPLES

1. Comparative Example 1

Ethanol was mixed with 25 wt % of HTEOS (hydrated 42.5%) to prepare a silica precursor solution, and then the silica precursor solution was introduced to glass fiber to perform a gelation reaction. Thereafter, using 2.9 vol % of $NH_4OH$ and ethanol having a water content of 10 wt %, aging was performed for an hour at 50° C. Thereafter, using 6.5 vol % of HMDS and ethanol having a water content of 10 wt %, surface modification was performed for 4 hours at 70° C. Lastly, under the condition of 150 bar and 70° C., supercritical drying was performed using $CO_2$ to produce silica aerogel.

2. Comparative Example 2

Silica aerogel was produced in the same manner as in Example 1 except that stirring was not performed when preparing a gel precursor (primary gelation).

3. Comparative Example 3

Silica aerogel was produced in the same manner as in Example 2 except that stirring was not performed when preparing a gel precursor (primary gelation).

4. Comparative Example 4

Silica aerogel was produced in the same manner as in Example 3 except that stirring was not performed when preparing a gel precursor (primary gelation).

5. Comparative Example 5

Silica aerogel was produced in the same manner as in Example 4 except that stirring was not performed when preparing a gel precursor (primary gelation).

6. Comparative Example 6

Silica aerogel was produced in the same manner as in Example 4 except that a gelation reaction was performed without introducing a second silica precursor solution to glass fiber but introducing only a gel precursor to the glass fiber.

EXPERIMENTAL EXAMPLES

For the comparative analysis of the physical properties of the silica aerogel produced according to each of Examples 1 to 8 and Comparative Examples 1 to 6, (1) the viscosity of a gel precursor, (2) the thermal conductivity of silica aerogel and (3) the thickness of silica aerogel were measured, and the measurement results are shown in Table 1 below.

1) Viscosity (cP) of Gel Precursor

A gel precursor was sufficiently put into a beaker of 4 cm or greater in diameter at 25° C. to a height of 8 cm or greater, and Brookfield viscosity meter DV3T(LV) was used to use the LV1 Spindle. At this time, viscosity was measured during the rotation of 100 rpm.

2) Thermal Conductivity (mW/mK) of Silica Aerogel

Using HFM436 of NETZSCH Co., Ltd., the thermal conductivity of silica aerogel at room temperature (25° C.) was measured.

3) Thickness (Mm) of Silica Aerogel

Five silica aerogel specimens were prepared for each Example/Comparative Example, and the thickness thereof was measured using a thickness gauge device. Thereafter, the average of the thickness values of each of the specimens was defined as the thickness of the silica aerogel and measured.

TABLE 1

|  | Gel precursor viscosity (cP) | Silica aerogel | |
|---|---|---|---|
|  |  | Thermal conductivity (mW/mK) | Thickness (mm) |
| Example 1 | 16.5 | 16.5 | 10.1 |
| Example 2 | 15 | 17.2 | 10.9 |
| Example 3 | 16 | 16.8 | 10.9 |
| Example 4 | 17 | 17.0 | 9.7 |
| Example 5 | 22 | 17.5 | 9.6 |
| Example 6 | 13.5 | 16.9 | 10.0 |
| Example 7 | 18.0 | 17.0 | 10.1 |
| Example 8 | 16.3 | 16.4 | 10.1 |
| Comparative Example 1 | Not formed | 17.9 | 10.7 |
| Comparative Example 2 | 60 | 21.0 | 9.8 |
| Comparative Example 3 | 42 | 19.0 | 9.9 |
| Comparative Example 4 | 48 | 20.3 | 9.6 |
| Comparative Example 5 | 80 | 21.5 | 9.5 |
| Comparative Example 6 | 15 | Not measurable | Not measurable |

Referring to the results according to Table 1, the gel precursor prepared by each of Comparative Examples has a higher viscosity so that it is difficult to for the same to penetrate the fiber, and the silica aerogel produced by each of Comparative Examples exhibits a higher thermal conductivity at a similar thickness so that the thermal conductivity thereof is poor.

Meanwhile, in Comparative Example 6 in which the second silica precursor solution was not added, the amount of the precursor was not sufficient to uniformly form an aerogel in the fiber. When added in the state of a gel precursor, additional gelation was not sufficiently performed after fiber was added, so that the aerogel did not settle on the fiber. Therefore, when an aging process, a surface modification process and a drying process were performed later, aerogel loss occurred, so that it was confirmed that it was not possible to obtain silica aerogel as much as possible to measure the physical properties thereof.

The invention claimed is:

1. A method for producing a silica aerogel, the method comprising:
   preparing a reactant by adding a basic catalyst to a first silica precursor solution;
   performing primary gelation in which the reactant is stirred at a stirring rate of 50 rpm to 500 rpm to form a gel precursor having a viscosity of 1 cP to 25 cP at 25° C.;
   introducing a second silica precursor solution to a fiber;
   performing secondary gelation in which the gel precursor is introduced to the fiber to which the second silica precursor solution was introduced to form a silica aerogel precursor;
   and drying the silica aerogel precursor to produce the silica aerogel.

2. The method of claim 1, wherein the primary gelation is performed under a temperature condition of 10° C. to 70° C.

3. The method of claim 1, wherein the first silica precursor solution and the second silica precursor solution comprise a tetra alkoxy silane compound and an organic solvent.

4. The method of claim 3, wherein the tetra alkoxy silane compound is hydrated to 30% to 45%.

5. The method of claim 3, wherein the first silica precursor solution contains the tetra alkoxy silane compound in an amount of 0.01 parts by weight to 15 parts by weight based on 100 parts by weight of the first silica precursor solution.

6. The method of claim 3, wherein the second silica precursor solution contains the tetra alkoxy silane compound in an amount of 50 parts by weight to 80 parts by weight based on 100 parts by weight of the second silica precursor solution.

7. The method of claim 3, wherein the organic solvent comprises at least one compound selected from the group consisting of an alcohol-based compound, a hydrocarbon-based compound, and a ketone-based compound.

8. A method for producing a silica aerogel sheet, the method comprising:
   preparing a reactant by adding a basic catalyst to a first silica precursor solution;
   performing primary gelation in which the reactant is stirred at a stirring rate of 50 rpm to 500 rpm to form a gel precursor having a viscosity of 1 cP to 25 cP at 25° C.;
   introducing a second silica precursor solution to a continuous fiber sheet;
   performing secondary gelation in which the gel precursor is introduced to the continuous fiber sheet to which the second silica precursor solution was introduced to be gelled;
   forming a plurality of layers by winding the secondary gelled continuous fiber sheet precursor;
   and drying the secondary gelled continuous fiber sheet to produce the silica aerogel sheet.

* * * * *